July 10, 1962 F. R. GRUNER 3,043,262
MAGNETIC FILTER SIGNAL DEVICE
Filed March 24, 1959

INVENTOR.
FREDERICK R. GRUNER
BY Lawrence J. Winter

ATTORNEY

United States Patent Office 3,043,262
Patented July 10, 1962

3,043,262
MAGNETIC FILTER SIGNAL DEVICE
Frederick R. Gruner, Westfield, N.J., assignor to Purolator Products, Inc., Rahway, N.J., a corporation of Delaware
Filed Mar. 24, 1959, Ser. No. 801,518
5 Claims. (Cl. 116—70)

The present invention relates to a signal device for indicating when a filter element becomes clogged and more particularly to a magnetic type filter signal device.

An object of the present invention is to provide a filter with signal device means operatively connected thereto to enable an operator to know when the filter becomes clogged and needs cleaning or replacement in order to maintain an efficient degree of filtration of the fluid flowed therethrough and avoid mechanical failure of the mechanism which the filtered fluid operates.

Another object of the present invention is to provide a filter signal device for detecting when the filter becomes clogged operated in response to a mechanism disposed entirely within the filter casing so that a signal is transmitted only when the filter becomes clogged from contaminants and which mechanism will not be effected by any variance in atmospheric or external pressures.

Another object of the present invention is to provide a signal device which indicates the need for servicing the filter element operated in response to a mechanism located entirely within the filter casing with no communication between the mechanism and the indicator device through the casing wall so that there can be no leakage of fluid from the casing interior.

Another object of the present invention is to provide a magnetic indicator or signal device provided with an armature which moves across the magnetic lines of force that hold the indicator of the device in a non-signalling position whereby the armature requires less force to move it.

Another object of the present invention is to provide a magnetic signal device which operates in response to a sensitive or quick acting trigger release mechanism holding it in its non-signalling position.

Another object of the present invention is to provide a signal indicator device which operates when the differential pressure across the filter element actuates the relief valve of the filter unit.

Figure 1:
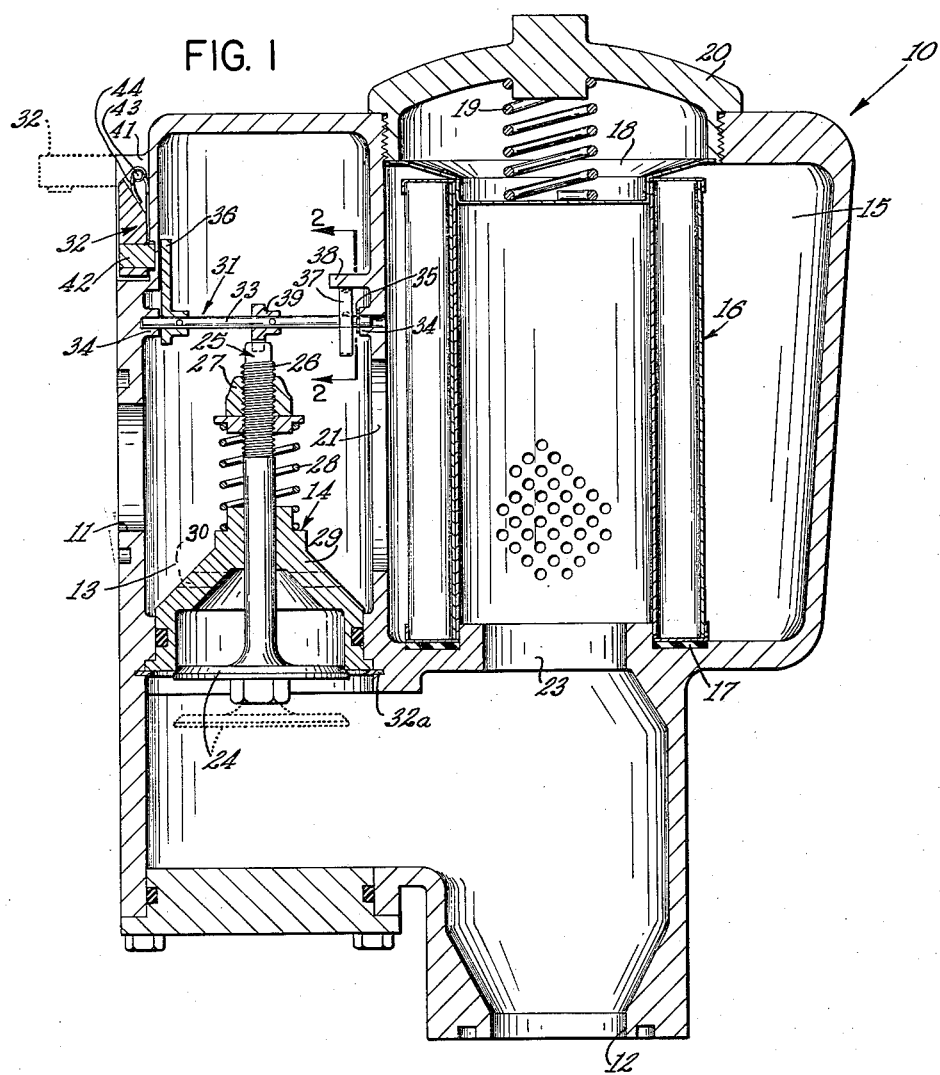
Figure 2:
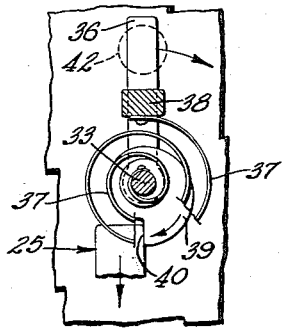

Various other advantages of the invention will be apparent from the following description when considered in connection with the accompanying drawing forming a part thereof, and in which:

FIG. 1 is a side elevational view, partly in section, illustrating the invention, and FIG. 2 is an enlarged detail section taken on lines 2—2 of FIG. 1.

Referring to the drawings the reference numeral 10 designates a filter housing or casing provided with an inlet 11 and a discharge opening 12 therein for flowing liquid to be filtered through the filter unit. A by-pass chamber 13 provided in the housing adjacent inlet 11 has a by-pass or relief valve 14 therein. A filter chamber 15 is disposed in the housing adjacent chamber 13 and has an annular resin impregnated pleated paper filter 16 therein although the filter may be of sintered metal, wire mesh or the like. Filter 16 is seated on a gasket 17 while the upper end of the filter element is sealed by member 18 which extends into the center tube of the filter and is held thereagainst by compression spring 19 mounted against the inner surface of the detachable filter cover 20.

During normal operation, oil to be filtered enters inlet 11 and flows through chamber 13 and opening 21 between the by-pass and filter chambers, and thereafter passes in an outside-in direction through filter element 16, the contaminants in the oil being deposited on the outer surface of element 16 after which the cleaned oil is discharged from chamber 15 through opening 23 and passes out of the filter unit through outlet 12.

By-pass or relief valve 14 comprises a valve disc 24 secured to a valve stem 25 provided with an externally threaded upper end 26 on which is mounted an adjustable nut member 27. A compression spring 28 is mounted around the valve stem between member 27 and the valve spider 29. Openings 30 are provided in valve spider 29 to permit the oil to act against the upper side of valve disc 24. Spider 29 is secured in chamber 13 by a shoulder thereon and snap ring 32a inserted in a circumferential recess in the chamber wall. Valve disc 24 is normally maintained seated during operation of the filter unit against a complementary mating surface on valve spider 29 being held there by compression spring 28 urging the valve stem and disc in an upward direction.

An actuator mechanism 31 that is operatively responsive to the movement of valve 14 is disposed entirely within by-pass chamber 13 for actuating the magnetic signal device 32 disposed in the outside wall of the filter unit. Mechanism 31 comprises a horizontal rod or shaft 33 having the opposite ends thereof positioned within blind bearings or lugs 34 formed in the opposite side walls of chamber 13. A snap ring 35 on the shaft prevents it from slipping out of the lugs. A vertical rectangular shaped armature or bar 36 is fixed on rod 33 by a pin or other similar means in the magnetic field of device 32 to turn or rotate with the rod. A coiled torsion spring 37 is disposed on the opposite end of rod 33 and has one end fixed thereto and the opposite end secured to a horizontal bar or member 38 disposed on the inner chamber wall above the blind bearing 34 adjacent thereto. A cam member 39 is fixedly secured to rod 33 midway between armature 36 and spring 37 in alignment with valve stem 25. Cam 39 rotates with rod 33 and is provided with a flat surface or shoulder 40 on one side thereof adapted to normally abut the upper end of valve stem 25 so that armature 36 is maintained in a vertical position in alignment with signal device 32, as shown in FIG. 2. Looking at FIG. 2, torsion spring 37 is coiled to rotate armature 36 in a clockwise direction approximately 90° when valve stem 25 moves downwardly beyond the end of shoulder 40 and releases the shoulder from contact therewith, as hereinafter described.

Signal device 32 comprises a substantially rectangular block adapted to seat within recess 41 formed in the outer casing wall of the filter unit adjacent chamber 13. The outer end of the signal device is provided with a cylindrical magnet 42 disposed therein in alignment with armature 36 when the armature is disposed in an upright position. Signal device 32 is pivotally connected to the casing wall by a pin 43. A snap spring 44 is mounted on pin 43 to continuously urge the signal device into its signal position as indicated in dotted lines in FIG. 1. Armature 36 normally holds the signal device 32 in its seated or non-signalling position by magnetic attraction between it and magnet 42 since the armature is disposed in its magnetic field of force.

During normal operation of the filter unit of the present invention, oil to be filtered enters through inlet 11 and passes through opening 21 around the outside of the filter element 16 flowing therethrough in an outside-in direction so that any contaminants in the oil are deposited on the outer surfaces of the pleated paper filter element. Thereafter the cleaned oil is discharged through the center tube of the filter element and opening 23 and passes out of the filter unit through discharge outlet 12. Relief valve 14 is closed or seated at this time by compression spring 28 holding valve stem 25 in its uppermost position with valve disc 24 seated. The upper end of the valve stem 25 extends beyond the lower end of cam 39 so that shoulder 40 thereon rests against the upper edge of the valve stem as shown in FIG. 2 and prevents torsion spring 37 from rotating rod 33 and armature 36 in a clockwise direction.

When the filter element 16 becomes clogged with contaminants filtered out of the oil passing therethrough, the differential pressure across the filter element increases. When sufficient pressure is built up to overcome the force of compression spring 28 maintaining valve disc 24 seated, the valve will move downwardly and unseat or open, as indicated by dotted lines in FIG. 1. As soon as the upper end of valve stem 25 moves downwardly and clears shoulder 40 of cam 39, the force in torsion spring 37 rotates armature 36 in a clockwise direction about 90° thereby moving the armature out of the magnetic field of force of magnet 42 so that leaf spring 44 snaps the signal device 32 in a horizontal direction or into its signal position indicating that the filter element needs replacement or cleaning. It will be noted that since armature 36 moves perpendicular to or across the magnetic lines of force emitted from magnet 42 it requires much less force to move it than if it moved in a direction parallel to the magnetic lines of force.

Thus, the present invention provides a signal device which is sensitive and quick acting and permits a trigger action to indicate the filter element needs servicing.

It will be further observed that since the entire actuating mechanism 31 is disposed within the filter casing without any aperatures or holes through the casing, there can be no leakage of oil out of the housing which so frequently occurs in conventional signal device mechanisms extending through the casing wall.

Inasmuch as various changes may be made in the form, location and relative arrangement of the several parts without departing from the essential characteristics of the invention, it will be understood that the invention is not to be limited except by the scope of the appended claims.

What I claim is:

1. An indicator for use with a valve comprising a casing, a magnetic signal device disposed on the outside of said casing, a stem on the inside of said casing adapted to seat and unseat a valve, a rotatable member in said casing, an armature member fixed to said rotatable member within the magnetic field of force of said magnetic signal device, said rotatable member and armature member being positioned for rotation in a plane perpendicular to the field of force of said signal device, said armature member being adapted to hold said signal device in a non-signalling position, locking means fixed to said rotatable member and contacting said stem to prevent the rotatable member from rotating when the stem maintains the valve seated, and means for rotating said rotatable member and said armature member transversely of the magnetic lines of force of said signal device when the stem unseats the valve, and means for moving the signal device to a signal position when the stem unseats the valve.

2. The indicator of claim 1 wherein said rotatable member is a horizontally disposed rod, and said locking means comprises a cam member fixed on said rod and abutting said stem.

3. The indicator of claim 2 wherein said magnetic signal device is disposed in a recess on the outside of said casing, oppositely disposed bearings on the interior of said casing carry said rotatable member, and said cam member has a shoulder in contact with said stem when stem seats the valve.

4. The indicator of claim 1 wherein said armature member comprises a vertical bar secured to said rotatable member in alignment with said signal device when the stem seats the valve, and said means for rotating said rotatable member and said armature member comprises a torque spring member for rotating them in a clockwise direction.

5. An indicator of claim 1 wherein said magnetic signal device has a magnet on one end thereof, said said rotatable member is a horizontal shaft rotatably supported in bearings, and said armature member comprises a vertical bar secured to the shaft in alignment with said magnet when it is in a non-signalling position, and the means for rotating the said rotatable member comprises a torsion spring for rotating it approximately 90° in a clockwise direction out of alignment with said magnet.

UNITED STATES PATENTS

References Cited in the file of this patent

| | | |
|---|---|---|
| 2,448,166 | Adams | Aug. 31, 1948 |
| 2,455,699 | Perret | Dec. 7, 1948 |
| 2,615,419 | Topping | Oct. 28, 1952 |
| 2,633,098 | Ellis | Mar. 31, 1953 |
| 2,669,707 | Ehrman | Feb. 16, 1954 |